United States Patent [19]

Leidenix

[11] Patent Number: 5,024,050
[45] Date of Patent: Jun. 18, 1991

[54] REEL BAT

[76] Inventor: Monte Leidenix, 2100 S. 29th St., Apt. 118, Grand Forks, N. Dak. 58201

[21] Appl. No.: 479,625

[22] Filed: Feb. 14, 1990

[51] Int. Cl.⁵ .......................................... A01D 57/02
[52] U.S. Cl. .......................................... 56/220
[58] Field of Search .............. 56/220, 400, 14.4, 227, 56/226, 219, 221-225; 52/309.16

[56] References Cited

U.S. PATENT DOCUMENTS

| | | | |
|---|---|---|---|
| 2,209,997 | 8/1940 | Nordhougen | 56/220 |
| 2,301,873 | 10/1942 | Heth et al. | 56/220 |
| 2,457,490 | 12/1948 | Press | 56/220 |
| 2,685,161 | 8/1954 | Scranton et al. | 56/220 |
| 2,949,720 | 8/1960 | Ansel | 56/220 |
| 3,148,494 | 9/1964 | Scheidenhelm | 56/400 |
| 3,313,674 | 4/1967 | Mathews | 52/309.16 X |
| 3,452,497 | 7/1969 | Warp | 52/309.16 X |
| 3,596,448 | 8/1971 | Van Buskirk | 56/63 |
| 4,038,810 | 8/1977 | Williams et al. | 56/220 |
| 4,472,928 | 9/1984 | Easton | 56/220 |
| 4,495,755 | 1/1985 | Johnson | 56/364 |
| 4,520,620 | 6/1985 | Gessel et al. | 56/400 |
| 4,593,520 | 6/1986 | Keizman | 56/400.06 |
| 4,776,155 | 10/1988 | Fox et al. | 56/220 |
| 4,882,899 | 11/1989 | Jasper et al. | 56/220 |

Primary Examiner—Hoang C. Dang
Attorney, Agent, or Firm—Zarley, McKee, Thomte, Voorhees & Sease

[57] ABSTRACT

A plastic reel bat for harvesting equipment is described comprising a generally rectangular member having a pair of spaced-apart reinforcing members embedded therein which extend substantially the entire length thereof.

5 Claims, 2 Drawing Sheets

REEL BAT

BACKGROUND OF THE INVENTION

This invention relates to a reel bat for harvesting equipment such as combines or swathers and more particularly to a reel bat which is comprised of a plastic material and which has elongated reinforcing members embedded therein and extending substantially the entire length thereof.

Initially, reel bats for harvesting equipment such as combines or swathers were formed from wood. The wood reel bats perform their intended function very well but are easily broken should the bat strike a rock or dirt clump. To overcome the breakage problem associated with wood reel bats, metal bats have been provided. However, the metal bats also are easily bent or broken. Further, the metal bats are quite expensive to manufacture.

It is therefore a principal object of the invention to provide a reel bat which is comprised of plastic.

Yet another object of the invention is to provide a reel bat comprised of plastic material and which has reinforcing members embedded therein to strengthen the reel bat.

Still another object of the invention is to provide a reel bat of the type described which is economical of manufacture and durable in use.

These and other objects of the present invention will be apparent to those skilled in the art.

SUMMARY OF THE INVENTION

Figure 1:
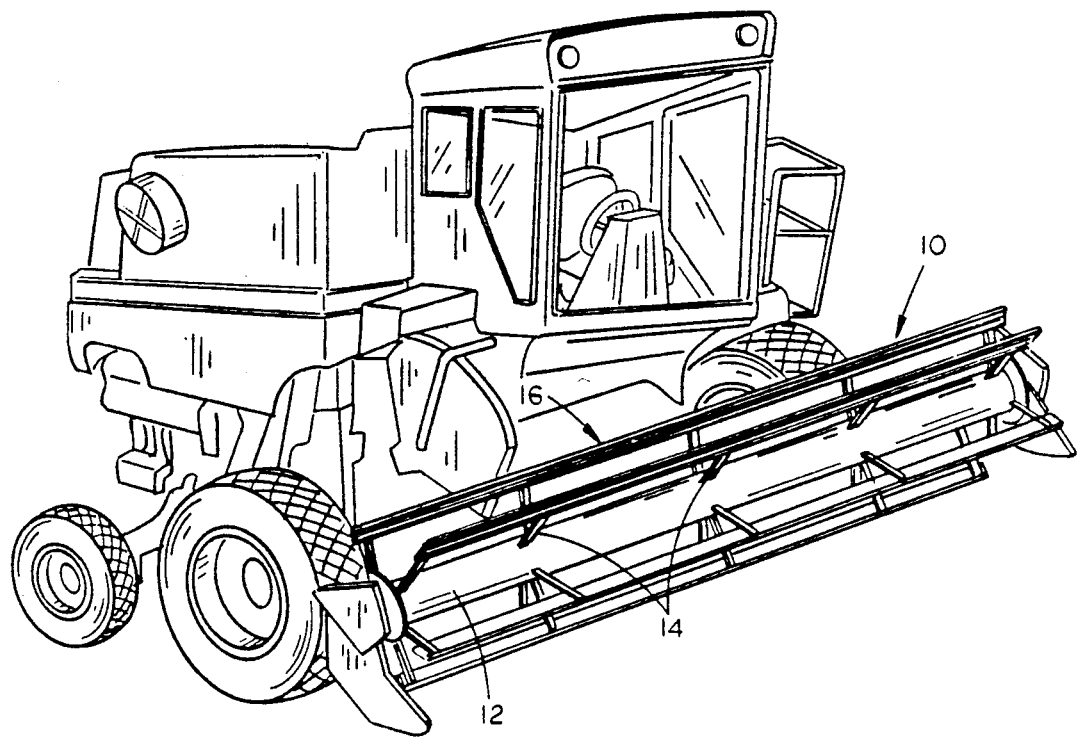
FIG. 1 is front perspective view of a combine having the reel bats of this invention mounted thereon.

A reel bat for harvesting equipment such as a combine or swather is described and is comprised of an elongated generally rectangular-shaped plastic member having a front surface, a back surface, a trailing edge and a leading edge. At least one elongated fiberglass rod is embedded in the reel bat and extends substantially the length thereof to add strength to the reel bat. The plastic is preferably is ABS which is extremely durable and which will not break should the bat strike a rock, dirt clump, etc.

DESCRIPTION OF THE PREFERRED EMBODIMENT

The numeral 10 refers to a reel which is normally found on harvesting equipment such as a combine or swather. Reel 10 is comprised of a central shaft 12 having a plurality of reel arms 14 extending radially outwardly therefrom. The numeral 16 refers to the reel bat of this invention.

Reel bat 16 is comprised of a plastic material such as ABS and includes a front surface 18, back surface 20, leading edge 22 and trailing edge 24.

Preferably, a pair of elongated reinforcing members 26 and 28 are embedded in the reel bat in a spaced-apart relationship and are preferably formed of fiberglass or plastic material. Although it is preferred that a pair of the reinforcing members 26 and 28 be utilized, in some situations only a single reinforcing member may be required.

Preferably, the reinforcing members 26 and 28 have a circular cross-section but may have a square cross section, rectangular cross section, etc. If the diameter of the reinforcing members 26 and 28 is required to be substantially greater than the thickness of the bat 16, front surface 18 of the bat 16 will present a pair of ridges 30 and 32 respectively. Further, the bat 16 may also have ridges 34 and 36 provided thereon.

Figure 2:
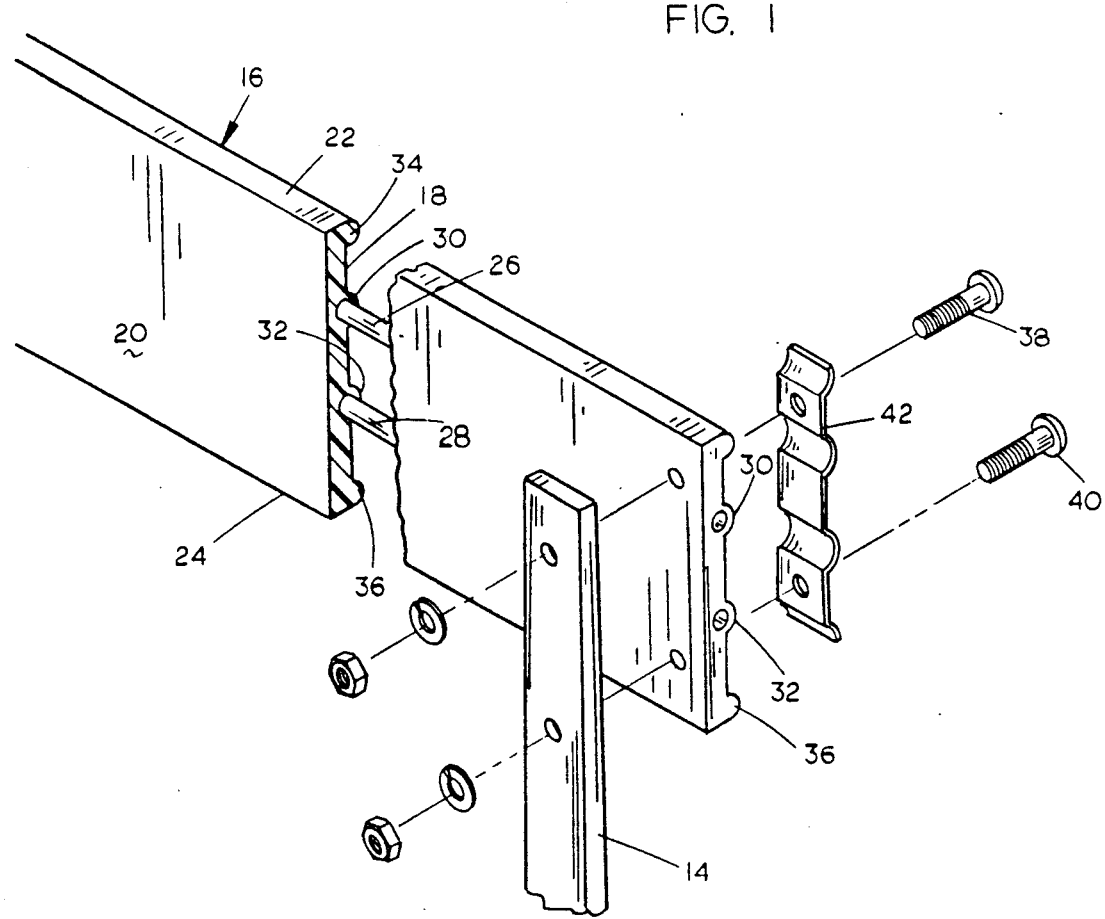
FIG. 2 is a perspective view of the reel bat of this invention with portions thereof cut away to more fully illustrate the invention.
Figure 3:
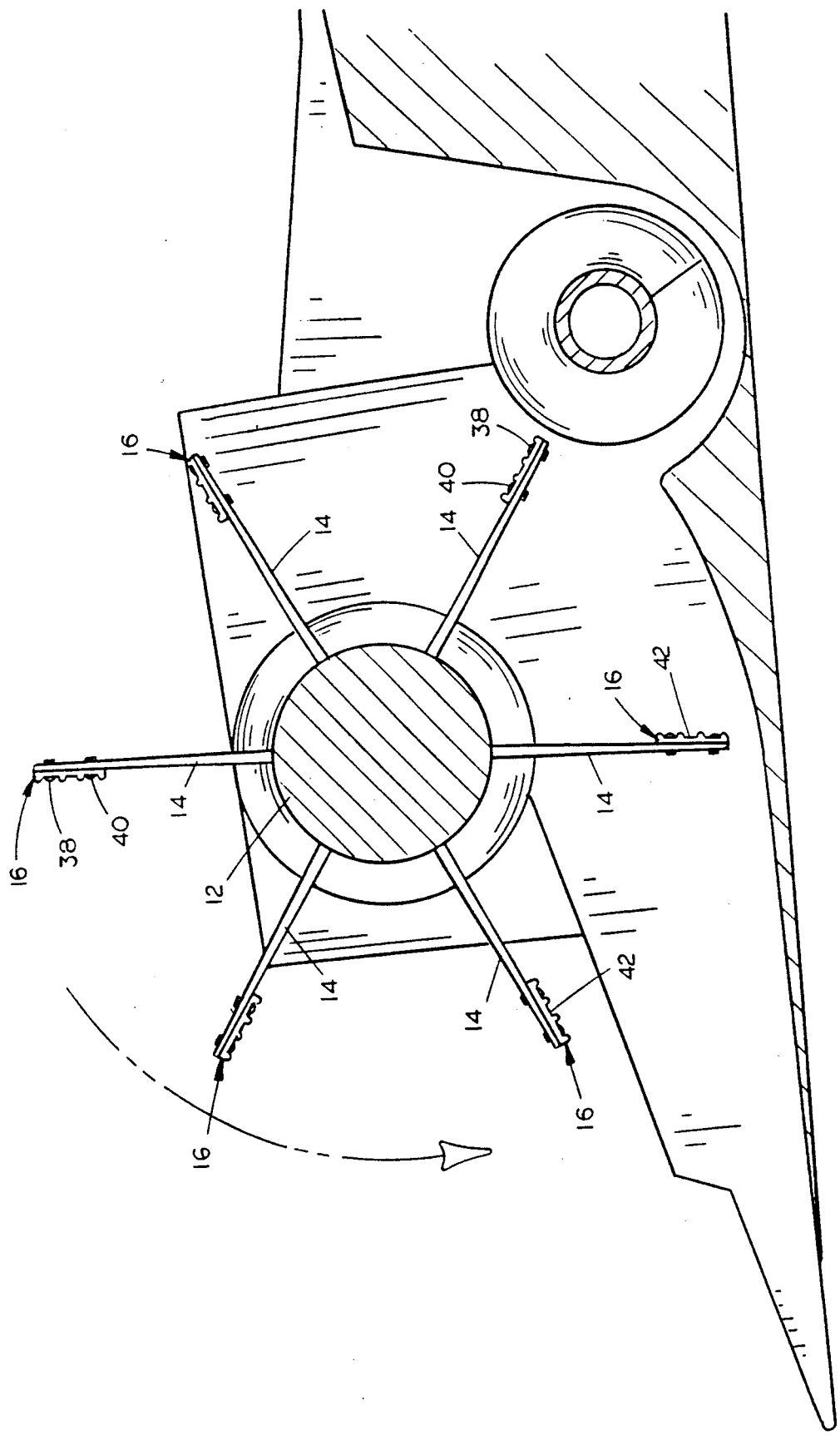
FIG. 3 is an end view of the invention mounted on a combine reel.

The bat 16 is secured to reel arm 14 by means of a pair of bolts 38 and 40 which extend through spacer 42 positioned on the front face of the bat 16 as seen in FIG. 2. Bolts 38 and 40 extend through arm 14 and are secured thereto by means of conventional washers and nuts, as seen in FIG. 2. As seen in FIG. 2, the spacer 42 has a configuration complementary to the front face of bat 16.

The reel bats 16 of this invention perform precisely the same manner as the prior art wooden and metal bats but are believed to be much more durable since the bats will not break as easily as the wood or metal bats should the bat strike foreign objects such as rocks, dirt clumps, etc. The plastic reel bats are economical of manufacture and the reinforcing members which preferably extend substantially the entire length thereof results in an extremely durable reel bat which accomplishes at least all of the stated objectives.

I claim:

1. In combination with a harvester having a harvester reel mounted thereon which is comprised of a plurality of reel arms extending radially outwardly from a central rotatable shaft, comprising:

a plurality of reel bats removably secured to said reel arms; each of said reel bats comprising an elongated, generally rectangular plastic member having front and back surfaces, a leading edge and a trailing edge, and at least one longitudinally extending reinforcing member embedded in said plastic member extending substantially the entire length thereof;

said reel bat having at least one forwardly presented ridge created by the presence of said at least one reinforcing member;

an upper and lower ridge projecting forwardly from each reel bat front surface, parallel to said at least one ridge created by the reinforcing member;

means for removably securing each said reel bat between at least a pair of said reel arms with the back surface of the bats abutting a forward face of the reel arms; and said means for removably securing said bats including:

an elongated spacer member extending transversely across the front surface of said bat, with depressions therein adapted to receive said upper and lower ridges and the at least one ridge created by the reinforcing member, and connector means for removably connecting said bats between said reel arms and spacer members.

2. The combination of claim 1 wherein a pair of spaced-apart reinforcing members are embedded in said plastic member.

3. The combination of claim 1 wherein said reinforcing member comprises an elongated rod.

4. The combination of claim 3 wherein said elongated rod is comprised of a fiberglass material.

5. The combination of claim 2 wherein each of said reinforcing members are comprised of a fiberglass material.

* * * * *